Patented Apr. 4, 1950

2,502,548

UNITED STATES PATENT OFFICE 2,502,548

PRODUCTION OF LINEAR POLYAMIDES

Sidney James Allen and James Gordon Napier Drewitt, London, England, assignors, by mesne assignments, to Celanese Corporation of America, a corporation of Delaware No Drawing. Application July 20, 1945, Serial No. 606,270. In Great Britain September 30, 1942

1 Claim. (Cl. 260—78)

This invention relates to improvements in the production of polymeric materials, and is more particularly concerned with the production of new polymers suitable for the production of filaments, films and plastic materials, and with the production of coating compositions, moulding powders, plastics, foils, films, sheets, filaments and other articles therefrom.

The application is a continuation-in-part of our applications S. No. 514,278 filed December 14, 1943 and S. No. 583,841 filed March 20, 1945.

In the production of linear polymers, for example linear polyamides, it has generally been considered essential to start with reagents containing two and only two reactive radicles. The presence of a third or a third and fourth reactive radicle normally leads to three-dimensional polymers which, if of sufficient molecular weight, are insoluble in all solvents and cannot be made fibre-forming. We have found that very valuable linear polyamides having in their structure rings containing carboxylic amide groups may be built up from monomeric materials, some at least of which contain more than two amide-forming groups, by using starting materials having their reactive groups in particular positions. We have found that by this means the production of three-dimensional polymers may be avoided and linear condensation products suitable, for example, for the manufacture of filaments, may be produced.

The invention is concerned only with polymers containing at least as many amide nitrogen atoms as amide carbonyl groups in the polymer as a whole and in the rings present in the structural units of the polymers. If the number of amide carbonyl groups exceeds the number of amide nitrogen atoms, the polymers obtained are relatively low-melting and are very easily hydrolysed, and hence are of much less value for the purposes to which the polymers of the present invention are to be applied. Thus, our polymers do not contain the structure $$-\overset{|}{\text{C}}-\text{CO}.\overset{|}{\text{N}}-\text{CO}-\overset{|}{\text{C}}-$$

In order that the number of amide nitrogen atoms shall be at least equal to the number of amide carbonyl groups, the number of carboxylic acid groups or their equivalent present in the reaction mixture (neglecting any small quantities of substances which may be used for the stabilisation of the viscosity of the polymers) should not exceed the number of amino groups present.

The carboxylic amide-containing rings may contain one or two nitrogen atoms. Those containing one nitrogen atom will have one carbonyl group, while those containing two nitrogen atoms may have either one or two carbonyl groups. The rings may have a number of different structures. For example, they may be ketopiperazine rings, and particularly 2.5-diketo and 2-keto piperazine rings (the polymers containing 2.3-diketopiperazine rings are more particularly described in application S. No. 583,841); they may have ketopyridazine rings, and particularly 3.6-diketo-pyridazine; they may have ketopyrimidine or keto-hydro-pyrimidine rings, and particularly 2.4-diketo-hexahydro-pyrimidine (hydro-uracil), polymers containing 2-keto-hexahydro-pyrimidine rings being described in the said application S. No. 583,841; they may have ketopyrazolidine and pyrazoline rings, for example 3.5-diketo-pyrazolidine and 3- or 5-keto-pyrazoline (pyrazolone); they may have keto-imidazoline rings, for example 2.4-diketo-imidazoline (hydantoin), polymers containing 2-keto-imidazoline rings being described in application S. No. 583,841; or they may have ketopyrrolidine or ketopiperidine rings, that is to say γ- or δ-lactam rings.

The new polymers are composed of a series of such carboxylic amide-containing rings linked together by chains of atoms. The atoms in these chains may be all carbon atoms or they may be both carbon atoms and oxygen atoms or the chains themselves may consist of or contain carboxylic amide groups. It is found that to obtain polymers having the highest melting points and greatest resistance to solvents, the two chains linking any one ring to the rest of the polymer molecule should be attached to the ring at points as remote from each other as possible. Thus with six-membered rings, it is preferable for the linking chains to be attached to the rings at positions para to each other. With five-membered rings, if the position at which one chain is attached be numbered the 1-position, the other chain is preferably attached at the 3- or 4-position.

The theory underlying the formation of linear polymers from monomeric reagents containing 3, 4 or more reactive groups, while quite simple when applied to particular compounds or particular series of compounds, is nevertheless complex when considered in its broad aspects. The invention will therefore be illustrated by a series of examples, and the general principles underlying the invention explained with reference to those examples.

Broadly the invention includes two types of reaction designed to produce the linear polyamide having the carboxylic amide-containing rings.

(1) In this type of reaction, two amide-forming groups in one molecule unite with amide-forming groups in another molecule to form a 5- or 6-membered ring. It is clear that this is not enough for the formation of the linear polymer, and the molecules must have additional amide-forming groups. These may likewise be such that rings are formed. For example, each molecule may have two pairs, i. e. four, amide-forming groups, and each pair may unite with a pair of amide-forming groups of another molecule to form a 5- or 6-membered ring. This is the case for example with the $\alpha.\alpha'$-diaminosebacic acid and similar $\alpha.\alpha'$-diamino-dicarboxylic acids. Alternatively, the additional reactive groups may be single reactive groups in each molecule which unite together to form the linear polymer. An example of such a reagent is aspartic acid, two molecules of which may unite to form the lactimide, leaving available one carboxylic acid group from each molecule to form a linear polymer with a diamine.

(2) In a second type of process, the amide-forming groups necessary for the formation of the ring are present in the same molecule, and this molecule includes in addition two amide-forming groups for the formation of the linear polymer.

A third type of reaction, in which a reagent containing two reactive groups is combined with a reagent containing four, six, eight, etc. reactive groups to form a ring or rings and at the same time to form the linear polymer, is described in application S. No. 583,841.

The invention will now be illustrated by reference to certain broad types of monomeric reagents, and will be illustrated by specific examples showing the production of polymers using those reagents.

TYPE I

One kind of starting material for this type of reaction consists of the $\alpha\alpha'$-diamino-dicarboxylic acids. These may be either $\alpha\alpha'$-diprimary-amino-dicarboxylic acids or $\alpha\alpha'$-disecondary-amino-dicarboxylic acids, or, of course, $\alpha\alpha'$-primary-secondary-diamino-dicarboxylic acids. These $\alpha\alpha'$-diamino dicarboxylic acids may be of the general formulae:

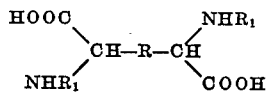

and

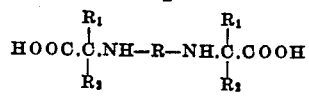

Polymer formation from such diamino-dicarboxylic acids may be brought about by heating, the structural units of the respective polymers being represented thus:

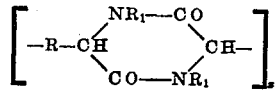

and

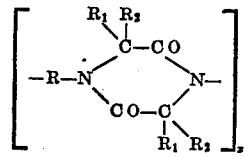

We prefer to employ diamino-dicarboxylic acids which contain at least one primary-amino group. By this means the 2.5-diketo-piperazine ring which is formed contains at least one hydrogen atom attached to a nitrogen atom, or alternatively the polymer contains some rings in which both nitrogen atoms carry hydrogen atoms and other rings in which the nitrogen atoms carry no hydrogen. It is preferable to form rings in which the nitrogen atoms do carry hydrogen atoms, since it is found that not only does the presence of this hydrogen atom attached to the nitrogen increase the melting point of the polymer, but it also increases the resistance of the polymer to aqueous media, which is a very important consideration when the polymers are to be made into textile filaments. Suitable starting materials which are diprimary-amino-dicarboxylic acids are 2.6-diamino-pimelic acid, 2.7-diamino-suberic acid, 2.8-diamino-azelaic acid, 2.9-diamino-sebacic acid, etc. Other suitable raw materials of this type include 2.3-diamino-succinic acid, in which case R in the first general fromula above is a direct bond. 2.4-diamino-glutaric acid constitutes a special case and will be discussed in more detail below. The chain joining the two pairs of amide-forming groups may contain other atoms in addition to carbon. For example other suitable raw materials include $\alpha.\alpha'$-diamino-diglycollic acid and $\alpha.\alpha'$-diamino dihydracrylic acid and homologues thereof. Such reagents may be made by the standard methods from the ether dicarboxylic acids, e. g. by bromination and replacement of the bromine by amino groups. Instead of using the carboxylic acids in the free state, their esters, halides, amides or (if water is present) nitriles, may be used.

The disecondary-dicarboxylic acids of the second general formula above are conveniently prepared by condensing an organic diamine with formaldehyde or other aldehyde or ketone and hydrogen cyanide. This may be carried out by mixing the diamine hydrochloride, formaldehyde or other aldehyde or ketone and an alkali metal cyanide. By this reaction the dinitriles of dicarboxylic acids of the above type are produced, which may be hydrolysed to the carboxylic acids, e. g. by means of baryta. While as with the $\alpha\alpha'$-diprimary-amino-dicarboxylic acid, the glycine or other $\alpha$-amino-carboxylic acid residues may be united by a single direct linkage (joining in the present case the nitrogen atoms), it is preferable that their nitrogen atoms should be linked by a succession of methylene groups. Thus, for example, it may be tetramethylene, pentamethylene, hexamethylene, decamethylene or the like, such starting materials being built up respectively from tetramethylene diamine, pentamethylene diamine, hexamethylene diamine and decamethylene diamine. The structural unit of the polymer from this type of starting material also contains the 2.5-diketopiperazine ring, but in this case the divalent organic radicle joining the rings is united to the nitrogen atoms, whereas with the other type of $aa'$-diamino-dicarboxylic acid, the divalent organic radicle is united to the carbon atoms of the diketopiperazine rings.

Similarly, polymers containing 3.5-diketo-pyrazolidine rings or 3.6-diketopyridazine rings may be produced by condensing a dihydrazine with a bis-malonic acid or a bis-succinic acid, the general equations for the production of these types of polymer being:

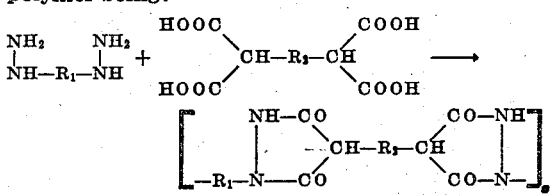

and

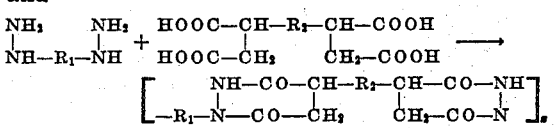

However, it is found that the dihydrazines are relatively difficult monomeric materials to work with, and hence it is difficult to carry the condensation sufficiently far to produce a polymer of fibre-forming dimensions.

A further reaction of this same general type consists in condensing a dicyanhydrin with a diurea, the polymerisation involving the elimination of ammonia and the production of a polymer containing the 2.4-diketo-imidazoline or hydantoin ring, thus:

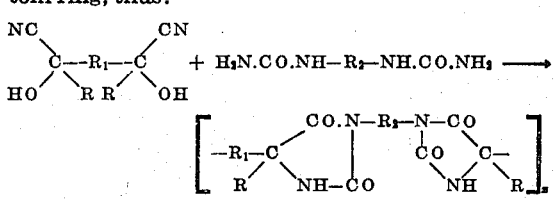

where R may be hydrogen alkyl etc. The dicyanhydrins for this type of reaction include, for example, $aa'$-dioxy suberonitrile and $aa'$-dioxy sebaconitrile and may be made by the addition of hydrocyanic acid to the appropriate dialdehyde, for example, and suberic dialdehyde, or to a suitable diketone, for example 2.7-octadione. The diureas, for example tetramethylene diurea, pentamethylene diurea, hexamethylene diurea and decamethylene diurea, are produced from the corresponding diamines by heating with urea, in which case ammonia is eliminated, or by simple addition of isocyanic acid. The above reaction is an instance of the use of a nitrile together with water as an equivalent of the corresponding carboxylic acid. In the present case the water is produced in the reaction between the hydroxy groups and the urea residues.

The same type of polymer, namely a polyhydantoin, may be obtained by condensing an $aa'$-diamino-dicarboxylic acid with a diurethane, a diurea or a di-isocyanate.

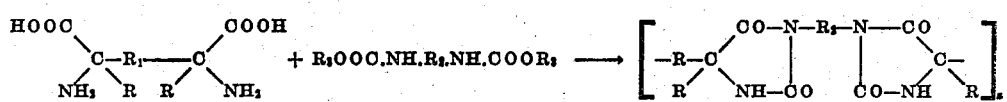

Suitable diamino-dicarboxylic acids are those described above with reference to the production of polymers containing the diketo-piperazine ring. Again in the present case we prefer to employ the $aa'$-diprimary-amino-dicarboxylic acids, since by this means each hydantoin ring contains a nitrogen atom carrying a hydrogen atom, with consequent improvement in the properties of the polymer. As suitable diurethanes, diureas and di-isocyanates, those corresponding with ethylene, trimethylene, tetramethylene, pentamethylene and hexamethylene diamines may be used.

Polymers containing 2,4 - diketo - hexahydropyrimidine rings, i. e. polyhydro-uracils, may be produced by similar methods. In one method a bis-$\beta$-imino-propionic acid is condensed with a diurethane, a diurea or a di-isocyanate. The equation in the case of using a diurethane is as follows:

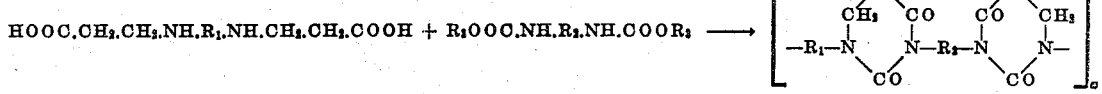

The bis-$\beta$-imino-propionic acids for use in this synthesis may readily be produced by addition of 2 moles of acrylonitrile to a diamine, for example ethylene diamine, trimethylene diamine, tetramethylene diamine, hexamethylene diamine, and the like, followed by hydrolysis of the resulting dinitrile. This synthesis is described in detail in U. S. application 603,110 filed July 3, 1945, now abandoned. It will be noted that the above polyhydro-uracil contain no hydrogen atoms attached to nitrogen and hence is rather sensitive to water. Polymers containing the hydro-uracil ring but having hydrogen atoms attached to nitrogen in the rings may be produced by reaction between a $\beta.\beta'$-di-primary amino-dicarboxylic acid or an $aa'$-diolefinic dicarboxylic acid and a diurea. $\beta.\beta'$-diprimary-amino-dicarboxylic acids may be produced by reduction of the nitrile groups and, if desired, saponification of the ester groups in alkylene bis-cyanacetic esters, prepared from an alkylene dihalide and two moles of mono-sodium cyanacetic ester. The diolefinic acids may be of the type $HOOC.CH=CH-R_1-CH=CH.COOH$ where $R_1$ is a divalent radicle or a direct bond as in muconic acid, homopiperylene dicarboxylic acid HOOC.CH=CH.CH₂CH₂.CH=CH.COOH, ββ' - p-phenylene diacrylic acid

and ββ'-2,2'-diphenyl diacrylic acid

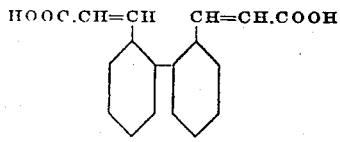

or they may be of the type

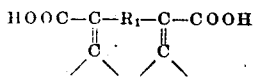

again including the case where $R_1$ is a direct bond. Acids of this second type include derivatives of fulgenic acid

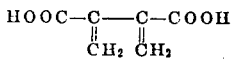

for example tetramethyl fulgenic acid (di-isopropylidene succinic acid), α-δ-diphenyl fulgenic acid (dibenzylidene succinic acid) and αα-dimethyl-δδ-diphenyl fulgenic acid. The reactions of the above β,β'-di-primary-amino-dicarboxylic acid and of the two types of dicarboxylic acid with the diurea are probably represented by the equations:

(i) 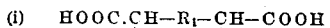
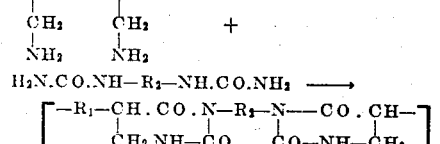

(ii) 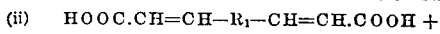
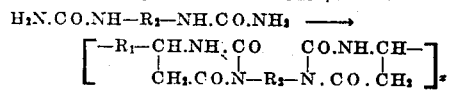

and (iii) 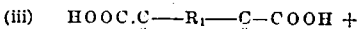
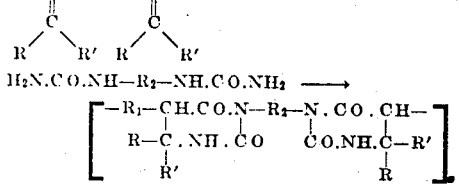

Further polymers within this general type of polymer are as follows:

(a) A diamidine is condensed with a diacetoacetic ester, according to the general equation:

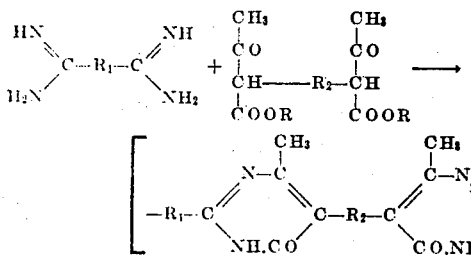

to produce a poly-pyrimidone. The diamidine is best used in the form of the hydrochloride, and the reaction carried out in the presence of caustic soda or other suitable base. The diamidines may be produced from the corresponding dinitriles, for example the dinitriles of adipic acid or its homologues, as mentioned above, by first converting to the bis-imino-ether by treatment with hydrochloric acid and an alcohol, and then treating the bis-imino-ether with ammonia. In order to conserve ammonia, it may be desirable to neutralise, at least in part, the hydrochloric acid used in the preparation of the imino-ether. This may be done with caustic soda, but, inasmuch as it is preferred to use the diamidine hydrochloride in the final polymerisation, this neutralisation of the hydrochloric acid associated with the imino-ether may be carried to a point short of liberation of the free imino-ether base. Suitable bis-aceto-acetic esters may be produced by a condensation of the sodium compound of aceto-acetic ester with dihalides, and particularly polymethylene dihalides, for example tetramethylene dibromide, pentamethylene dibromide, hexamethylene dibromide and the like.

(b) A similar type of condensation consists in condensing a diamidine with a bis-malonic ester to produce a poly-diketo-tetrahydro-pyrimidine, according to the equation:

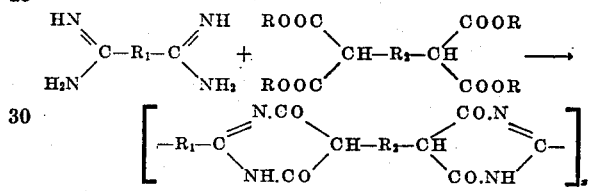

Here again it is desirable to carry out the polymerisation using the diamidine hydrochloride in an alkaline medium, for example alkaline sodium ethylate. The bis-malonic acids may be produced in a manner similar to the bis-aceto-acetic esters of polymer (a) but using sodium malonic ester instead of sodium aceto-acetic ester. Polymers of this type, that is to say poly-diketo-tetrahydro-pyrimidines, tend to be of very high melting point, and consequently, in order to obtain tractable polymers, it is desirable that the divalent radicles $R_1$ and $R_2$ in the above equations should together contain a relatively large number of methylene groups or equivalent groups; for example sebaconitrile may be used in the preparation of the diamidine and/or decamethylene dihalide may be used in the preparation of the bis-malonic ester.

A variant of the above reaction which produces the same type of polymer consists in condensing a bis-malonic ester with a bis-malonamide, according to the equation:

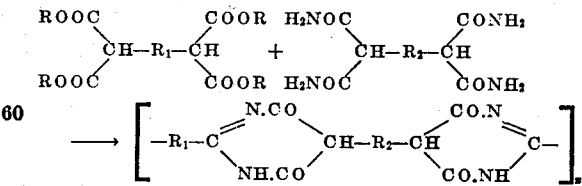

(c) Another type of polymer, namely a poly-imidazolone, may be produced by condensing a bis-imido-ether, for example those produced as intermediates for the diamidines of polymers (a) and (b), with a bis-NN' or a bis-CC' glycine ester. We prefer to use bis-CC'-glycine esters, since the polymers resulting from them contain a hydrogen atom attached to one of the nitrogen atoms in imidazolone ring. Suitable CC'-glycine esters are the esters of 2,6-diamino-pimelic acid, 2,7-diamino-suberic acid, 2,8-diamino-azelaic acid and 2,9-diamino-sebacic acid.

The production of this polymer is represented by the following equation:

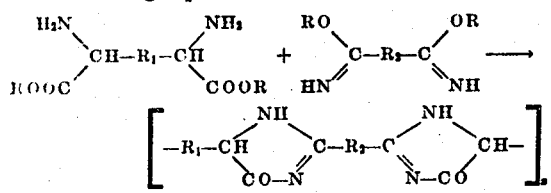

As stated above, NN'-diglycines may also be used, particularly where the desired application of the polymers is not filament-formation. The production of the polymer from the NN'-diglycine ester and the bis-imido-ether is represented by the equation:

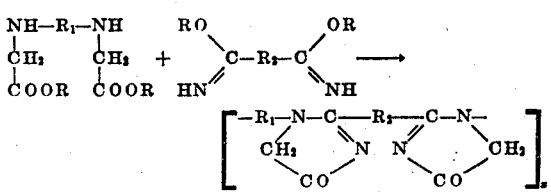

Suitable NN'-diglycine esters for this synthesis are the esters of αα'-diamino-dicarboxylic acids of this type already referred to above.

As previously explained, it is not essential for this Type I reaction for all the molecules in the reaction mixture to have four amide-forming groups. A similar type of polymer may be produced by means of molecules containing only three amide-forming groups. Two out of these three amide-forming groups are designed to make a carboxylic amide-containing ring with a pair of complementary amide-forming groups in another molecule, and each of the molecules contains one additional amide-forming group for the purpose of producing the linear polymer. The molecules containing three amide-forming groups are preferably α-amino-carboxylic acids containing one additional amide-forming group, which may be either the amino type of group or the carboxylic type of group. This additional amide-forming group should not be in a lactam-forming position with one of the other amide-forming groups in the same molecule. Thus, for example, glutamic acid on the one hand and ornithine (2.5-diamino-n-valeric acid) on the other, are not applicable for this purpose. In the case of using an α-amino-carboxylic acid containing an additional carboxylic acid group, the invention contemplates the use of two moles of the amino-dicarboxylic acid with 1 mole of a diamine, the polymer being produced in accordance with the equation

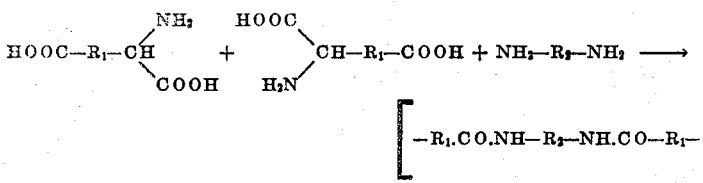

Suitable amino-dicarboxylic acids for this reaction are aspartic acid and α-amino-pimelic acid. It is not essential for the amino groups to be primary amino groups, and such bodies as N-methyl-aspartic acid may be used. Preferably, however, some, if not all, the amino groups in the reaction mixture are primary amino groups, so that in the final polymer, as explained above, at least some of the amide nitrogen atoms carry a hydrogen atom. A similar type of reaction consists in condensing 2 moles of imino-bis-acetic acid with 1 mole of diamine. In this case the amino-dicarboxylic acid contains a secondary amino group. Similarly we may use an α-amino-carboxylic acid containing an additional amino group, for example, 2.3-diamino-propionic acid, 2.3-diamino-n-butyric acid and 2.6-diamino-caproic acid (lysine). In this case 2 molecules of the diamino-carboxylic acid are condensed with 1 mole of a dicarboxylic acid to produce a polymer according to the equation

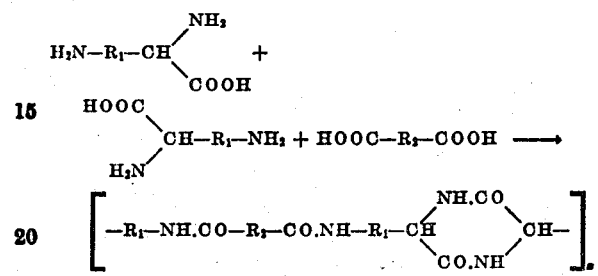

Here again it is preferable to employ reagents in which some, if not all, the amino groups are primary amino groups. Finally under this head we may condense an α-amino-carboxylic acid containing an additional carboxylic acid group with an α-amino-carboxylic acid containing an additional amino group. The same limitations apply to the position of the additional carboxylic acid and additional amino groups as referred to above, namely that they must not be in a lactam-forming position with another group in the same molecule. The equation for the production of the polymer reads as follows:

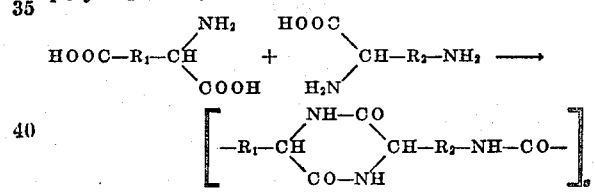

In this type of reaction in which an α-amino-carboxylic acid containing an additonal amide-forming group is employed as one of the reagents, we find that where the α-amino group is a primary amino group it is quite convenient to preform the lactimide by combining together the amino and carboxylic acid groups which are alpha to each other in two molecules. Thus, for example, we may start from the lactimide formed from two moles of aspartic acid, or again we may start from the lactimide formed from two moles of 2.3-diamino-propionic acid. In the case of the lactimide from aspartic acid, it is quite convenient to make this by simple treatment of diethyl fumarate with ammonia. By this means the diamide of the lactimide is produced which may either be used directly for condensation with a diamine, the polymerisation involving elimination of ammonia, or may be hydrolysed with a mild hydrolysing agent, such as baryta, to eliminate the amide groups without splitting the lactimide ring. Again, instead of using 2 moles of aspartic acid or 1 mole of the lactimide produced from 2 moles of aspartic acid, we may use 1 mole of aspartyl aspartic acid and condense it with an equimolecular proportion of a diamine.

The following examples illustrate the production of polymers by this first general type of reaction.

*Example I*

Diamino-sebacic acid, prepared by reaction of liquid ammonia with αα'-dibromo-sebacic acid or by hydrolysis of hexamethylene bis-phthalimido-malonic ester, was purified by dissolving in caustic soda, warming with a little charcoal, filtering and reprecipitating with hydrochloric acid. The pure white product had C, 51.78%; H, 8.83%; N, 12.00%. $C_{10}H_{20}O_4N_2$ requires C, 51.69%; H, 8.68%; N, 12.07%. 5 parts αα'-diamino-sebacic acid were suspended in 40 parts absolute ethanol saturated with dry hydrogen chloride and refluxed for 15 minutes. The acid dissolved to a clear solution from which the alcohol was removed by vacuum evaporation at 15° C. The residual solid was filtered off, washed with a little absolute ethanol and with ether and dried in vacuo, leaving 5.85 parts diamino-sebacic ethyl ester hydrochloride, as a colourless crystalline solid. Found: N, 7.83%; Cl, 19.87%. $C_{14}H_{30}O_4N_2Cl_2$ requires N, 7.76%; Cl, 19.63%. The ester hydrochloride could be purified by dissolving in a little warm ethanol and reprecipitating with ether.

The free diamino-diester was isolated by suspending 25 parts of the ester hydrochloride in 40 parts dry ethanol and adding a solution of 3.18 parts clean sodium in 40 parts absolute ethanol. The mixture was cooled to 0° C., filtered from sodium chloride, the alcohol removed under reduced pressure and the residual oil distilled at base temperature 150–60°, pressure 0.005 mm. Hg, giving a colourless oil which partly solidified on cooling. Found: C, 58.55% H, 9.26%. $C_{14}H_{28}O_4N_2$ requires C, 58.30%; H, 9.79%.

6.3 parts αα'-diamino-sebacic ester were heated in 50 parts m-cresol for 6 hours at 205° C. in nitrogen. The polymer was precipitated by addition of excess ether, extracted thoroughly with hot ether and then with water and dried in vacuo at 50° C. It was partially soluble in m-cresol and in formic acid. Found: C, 61.47%; H, 8.66%.

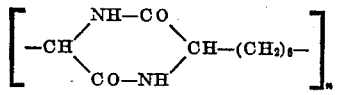

requires C, 61.20%; H, 8.22%.

*Example II*

72.6 parts of hexamethylene diamine in 60 parts of water were cooled in ice and neutralised with concentrated hydrochloric acid and 86.8 parts of potassium cyanide in 120 parts of water were added. 37 parts of formaldehyde (in the form of commercial forty percent formalin) were run into the stirred solution at 5–10° during 1 hour, the mixture held for 3 hours at room temperature, filtered and the hexamethylene bis-imino-acetonitrile thrown out as an oil by addition of 70 parts of solid potassium carbonate. The oil was separated, taken up in 200 parts of methyl alcohol, the solution dried over anhydrous sodium sulphate, treated with charcoal and filtered. (From this solution the hexamethylene bis-imino-acetonitrile dihydrochloride could be precipitated by addition of concentrated hydrochloric acid. Recrystallised from methyl alcohol it had M. P. 188–9° (dec.), Cl found 26.8%; $C_{10}H_{20}N_4Cl_2$ requires Cl, 26.53%).

The methyl alcoholic solution of the nitrile was evaporated to dryness under reduced pressure, leaving the crude nitrile as a low melting, crystalline solid. This was taken up in dry ethyl alcohol and filtered from inorganic salts and the solvent removed.

84 parts of the nitrile, 160 parts of barium hydroxide octahydrate and 3000 parts of water were refluxed for 13 hours, the barium precipitated by addition of the stoichiometric amount of sulphuric acid, the barium sulphate filtered off and the filtrate evaporated under reduced pressure until a considerable amount of the crystalline hexamethylene bis-imino-acetic acid had separated. This was filtered off and a further crop obtained by addition of ethyl alcohol to the mother liquors. The amino acid was purified by taking up in a small quantity of hot water and reprecipitating with ethyl alcohol. Hexamethylene bis-imino-acetic acid sinters at 257° and melts with decomposition at 265–6° (rapid heating). Found: C, 51.47%; H, 8.86%; N, 12.28%; $C_{10}H_{20}N_2O_4$ requires C, 51.69%; H, 8.68%; N, 12.07%.

3 parts of hexamethylene bis-imino-acetic acid, 7 parts of phenol or m-cresol and 1 part of 1% aqueous phosphoric acid were heated at 180° in a stream of pure nitrogen for 30 hours, additional phenol or m-cresol being added from time to time to make up for evaporation losses. Heating was continued at 218° for 20 hours, and finally at the same temperature for 3 hours at 18 mms. A tough polymer remained, from which fibres could be drawn at 255°. These fibres were characterised by fairly high elasticity and a strong tendency to crinkle. The polymer was soluble in m-cresol, formic acid and acetic acid and could be purified by precipitation from m-cresol with acetone. On rapid heating in air the polymer melted at about 235°. Found: C, 61.25%; H 8.68%.

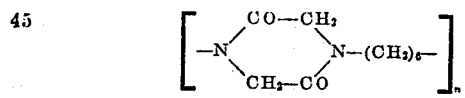

requires C, 61.20%; H, 8.22%.

*Example III*

6.3 parts of αα'-diamino-sebacic ester prepared as in Example I and 5.1 parts hexamethylene bis-imino-acetic acid were heated for 6 hours in 50 parts m-cresol at 205° in nitrogen. The product was precipitated with ether and washed thoroughly with hot ether. The polymer was soluble in m-cresol and formic acid, melted at about 180° and was stable above its melting point in a nitrogen atmosphere. Fibres could be drawn from the melt.

*Example IV*

8.0 parts of αα'-diamino-sebacic ester were heated in hydrogen for 6 hours at 220° C. to give a solid, slightly yellow, polymer which did not melt below 280° C. and which was substantially unaffected by a large variety of solvents. On the other hand a mixture of 6.4 parts of diamino-sebacic ester and 6.0 parts hexamethylene bis-imino-acetic ester heated for 6 hours in 50 parts of m-cresol at 205° C. yielded a polymer which after precipitation by addition of ether melted at about 160° C. and could readily be redissolved in m-cresol. The hexamethylene bis-imino-acetic ester was prepared as follows:

A suspension of 20 parts hexamethylene bis-imino-acetic acid in 160 parts absolute ethanol was saturated with hydrogen chloride at room temperature and then refluxed for 8 hours. Excess dry ether was added when the ester hydrochloride was precipitated, filtered off, washed with ethanol/ether and ether and dried in vacuo. Yield 24.0 parts. Found: C, 46.55%; H, 8.15%; Cl,20.0%. $C_{16}H_{30}O_4N_2Cl_2$ requires C, 46.53%; H, 8.37%, Cl, 19.63%.

The free bis-imino-diester was prepared as in Example I. It distilled at base temperature 145–155° C., 0.005 mm. Hg. Found: C, 58.70%; H,9.84%; N, 9.53%. $C_{14}N_{28}O_4N_2$ requires C, 58.30%; H, 9.79%; N, 9.72%.

TYPE 2

This type, as already explained, operates with a reaction mixture containing a reagent having four amide-forming groups, two of which are in a position such that a 5- or 6-membered carboxylic amide-containing ring can be formed. In other words, the reagent contains one amino group and one carboxylic acid group separated by three or four atoms. The simplest reagent of this type is ethylene bis-imino-acetic acid, which may be formed by the same method as the other polymethylene bis-imino-acetic acids referred to above, namely by condensing ethylene diamine hydrochloride with formaldehyde and a cyanide to form the corresponding nitrile, and hydrolysing the nitrile. The polymer-forming reaction for this type of reagent is as follows:

HOOC—CH$_2$—NH—CH$_2$—CH$_2$—NH—CH$_2$—COOH ⟶

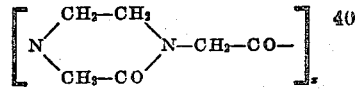

This, however, is not the preferred kind of polymer under this type, since, as will be seen from the formula, the polymer contains no amide nitrogen atoms carrying hydrogen atoms. Another reagent which forms a polymer in which the amide nitrogen atoms do carry hydrogen atoms is $aa'$-diamino-glutaric acid. Theoretically this body is capable of forming polymers of Type 1 containing a 2.5-diketo-piperazine ring because it contains two pairs of amino and carboxylic acid groups in which the amino and carboxy groups are in the α-position in both cases, and in addition is capable of forming polymers of the second type containing a 2-keto-pyrrolidine or γ-butyrolactam ring because both amino groups are separated by three atoms from a carboxylic acid group. It will be seen that, having formed one lactam ring, the remaining amino and carboxy groups are sterically incapable of forming a further lactam ring and are therefore available for forming the linear polymer. The two possible types of polymerisation of $aa'$-diamino-glutaric acid are represented by the equations:

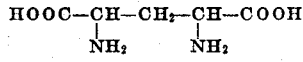

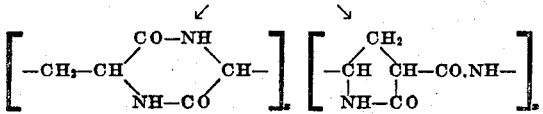

The left-hand polymer is the 2.5-diketo-piperazine type of polymer, whilst the right-hand polymer is the γ-butyrolactam type. So far we have been unable to assign a definite formula to the polymer produced from this monomeric reagent. It seems probable however that the polymer produced has the butyrolactam ring, i. e. is a polymer of the right-hand formula.

Another raw material for this type of polymer may be built up from nitromethane and acrylonitrile or acrylic ester. The resulting nitro-tricarboxylic ester may be reduced by hydrogenation to the lactam dicarboxylic ester. In the case of condensing nitromethane with acrylonitrile, the nitro-trinitrile produced is first converted to the ester and then reduced. The lactam di-ester may then be converted directly to form the polymer by condensation with an equimolecular proportion of a diamine, or may be hydrolysed to the amino-tricarboxylic acid, which is then condensed with a diamine. Hydrolysis of the nitro-tricarboxylic ester or nitrile to the free acid followed by reduction leads to a mixture of the aminotricarboxylic acid and the lactam dicarboxylic acid. The series of reactions where reduction is carried out on the nitro-triester is represented as follows:

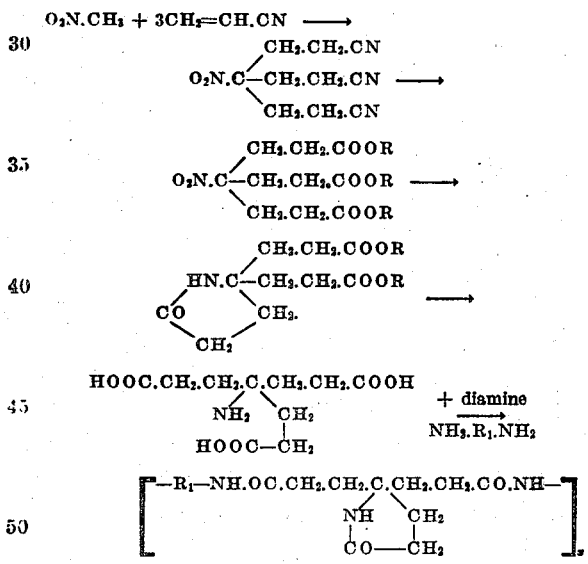

Suitable diamines for this condensation are ethylene diamine, tetramethylene diamine, pentamethylene diamine, hexamethylene diamine, heptamethylene diamine, decamethylene diamine, and the like.

A variant of the above method synthesis consists in forming a triamino-monocarboxylic acid for subsequent condensation with a dicarboxylic acid. This may be achieved by first condensing the nitromethane with only one molecule of acrylonitrile or acrylic ester, which is most efficiently carried out by using an excess of nitromethane, for example 5–10 molecules of nitromethane to 1 of the acrylic ester or acrylonitrile. The resulting γ-nitro-butyronitrile or γ-nitro-butyric ester is then saponified to the free acid and condensed with two molecules of acrylonitrile. The dinitrile of a nitro-tricarboxylic acid so produced is then hydrogenated or otherwise reduced so as to reduce both nitrile groups and also the nitro group. The triamino-monocarboxylic acid thus produced may then be condensed with a dicarboxylic acid. The series of reactions for this synthesis using acrylonitrile throughout, is represented by the following equations:

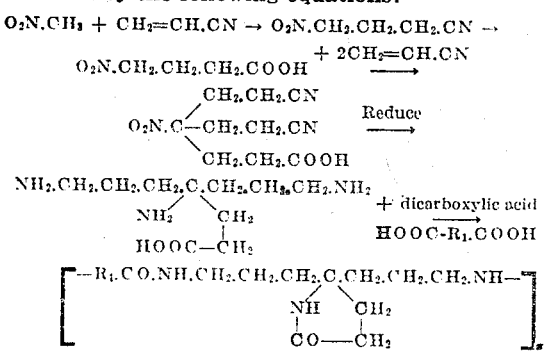

Suitable dicarboxylic acids for the final condensation are oxalic acid, glutaric acid, adipic acid, pimelic acid, suberic acid, azelaic acid, sebacic acid and the like.

In a similar way, acetone may be condensed with three moles of acrylonitrile or acrylic ester and the resulting monoketotricarboxylic acid derivative treated to convert the keto group to an amino group. This may be done by amidative reduction (e. g. after saponification of the trinitrile or triester) or by reduction of the keto group to a carbinol group, replacement of the hydroxy group of the carbinol by halogen, and replacement of the halogen by amino. The amino group in the resulting amino-tricarboxylic acid is then separated from each of the three carboxylic acid groups by four carbon atoms, so that it is in the position for forming a 2-keto-piperidine or δ-valerolactam ring with any one of them. This amino-tricarboxylic acid is then condensed with a diamine. In the case of this synthesis from acetone, a variation may be carried out similar to that described above for the synthesis from nitromethane. Thus the acetone may first be condensed with one mole of acrylonitrile or acrylic ester (again carried out most efficiently by using an excess of acetone). The resulting keto-nitrile is then saponified to the free acid and condensed with two molecules of acrylonitrile, and the resulting compound then converted to a triamino-monocarboxylic acid by reduction of the two nitrile groups to amino groups and conversion of the keto group to an amino group.

Again under this head we may mention a synthesis in which methyl ethyl ketone is condensed with two moles of acrylonitrile or acrylic ester and the resulting keto-dicarboxylic acid derivative treated so as to replace the keto group by an α-amino-carboxylic acid residue, e. g. by treatment with ammonium cyanide or with hydrocyanic acid followed by ammonia. The nitrile group may then be reduced so as to constitute a diamino-dicarboxylic acid in which one of the amino groups is separated from either carboxylic acid group by four carbon atoms and can therefore form a δ-valerolactam ring with it, whilst the other amino group is separated by five carbon atoms from either of the carboxylic acid groups and hence cannot form a 5- or 6-membered ring and is available with the other carboxylic acid group for forming the desired linear polymer. In this case it is unnecessary to use any additional reagent such as a diamine or dicarboxylic acid, since the diamino-dicarboxylic acid contains all the elements necessary for polymer formation. Instead of reducing the nitrile group, it may be saponified to constitute a mono-amino-tricarboxylic acid in which the amino groups and either one of two of the carboxy groups are, as before, in the position for forming a δ-valerolactam ring, while the remaining two carboxylic acids are available for condensing with a diamine in a way similar to that described above for forming a polymer from the amino-tricarboxylic acid obtained starting from nitromethane or acetone.

Another suitable synthesis for raw materials containing four amide-forming groups consists in starting from 2-acidyl-1-cyclohexanone or 2-acidyl-1-cyclopentanone or 2-acidyl-1-cycloheptanone. Preferably the acetyl compounds are used. These may be made by condensing ethyl acetate or other acetic ester with the cyclic ketone in presence of sodium, sodium ethylate or the like. Other acidyl compounds may be produced by using the corresponding esters of other carboxylic acids instead of the acetic esters. The 2-acidyl-cyclic ketones are then split by means of alkali to the corresponding keto-monocarboxylic acid. This keto-monocarboxylic acid is then condensed with one molecule of acrylonitrile, using the keto-carboxylic acid in excess so as to limit the condensation to one molecule of acrylonitrile, and the resulting nitrile saponified to the ketodicarboxylic acid, which is then treated with ammonium cyanide, as before, to make an α-amino-nitrile. This series of reactions is represented by the equations:

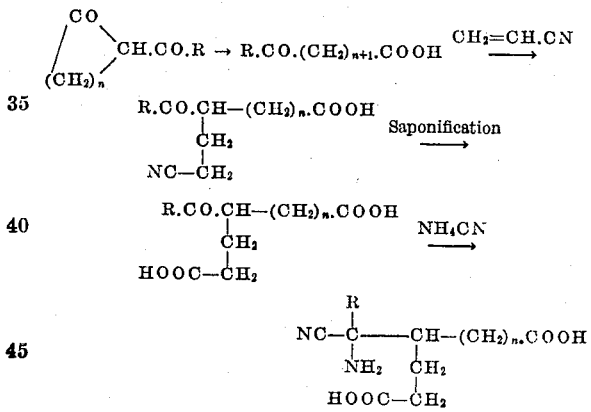

In the above series of equations, the letter $n$ represents 3, 4 or 5, and the symbol R may be any suitable alkyl or aryl group, but is preferably methyl. The resulting nitrilo-amino-dicarboxylic acid may finally be reduced to the corresponding diamino-dicarboxylic acid, which may be condensed with itself or may be saponified to the corresponding mono-amino-tricarboxylic acid, which may be condensed with a suitable diamine, as already described.

A further suitable synthesis for the raw materials starts with acetone or other suitable ketone of the formula $R_1.CO.CH_2.R_2$ and condenses it with formaldehyde. In the case of methyl ethyl ketone and acetone, as described in U. S. applications S. No. 498,578 filed August 13, 1943 now Patent No. 2,378,988 and S. No. 498,100 filed August 10, 1943 now Patent No. 2,395,414, the reaction is preferably carried out with a very considerable excess of the ketone, for example up to 10 or 20 moles, so as to get a good yield of the 2-methyl-3-ketobutanol or 3-ketobutanol. The keto-butanol may then be condensed with one molecule of acrylonitrile, the carbinol group converted to an alkyl halide group, for example by treatment with thionyl chloride, and the resulting compound then treated with ammonium cyanide to produce a mono-amino-trinitrile, which is then saponified to the mono-amino-tricarboxylic acid. The series of reactions is represented by the equations:

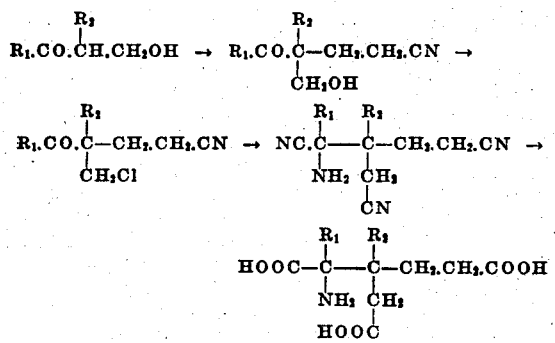

in which R₂ may be any alkyl or aryl group, but is preferably either hydrogen or methyl, and R₁ is preferably methyl. The resulting mono-amino-tricarboxylic acid may be condensed with a diamine as before.

The following examples illustrate the production of polymers of the general Type 2.

*Example V*

15.25 parts of nitromethane, 1 part of sodium methylate and 16 parts of tert-butanol were heated to 60° and 53 parts of acrylonitrile, containing a trace of hydroquinone as stabiliser, added with stirring during about 20 minutes at such a rate as to maintain the reaction mixture gently refluxing. Throughout this addition the external temperature was held at 60–70° C. The mixture was then refluxed, with stirring, for 30 minutes, the hot liquid made slightly acid with dilute hydrochloric acid and three times its volume of water added with stirring. A dark mass separated which was boiled with the motor liquors. On cooling a dark tarry material separated, together with a quantity of light brown crystals. The crystals and mother liquors were decanted off, the crystals separated and the mother liquors used to extract the tarry material at the boil. Repetition of this process five or six times, finally with the addition of activated charcoal, gave 27.8 parts of crude, crystalline tri-(β-cyanoethyl)-nitromethane M. 112–5°. This was purified by recrystallisation from water (with charcoal), yield 24.9 parts, M. 115°. Found: C, 54.6%; H, 5.68%; N, 25.6%.

$C_{10}H_{12}O_2N_4$ requires C, 54.55%; H, 5.49%; N, 25.45%.

11 parts tri-(β-cyanoethyl)-nitromethane were refluxed with 65 parts 20% hydrochloric acid for 6 hours. On cooling the mixture deposited the crystalline tri-(β-carboxyethyl)-nitromethane, which was filtered, washed with cold water till free from ammonium chloride and hydrochloric acid and recrystallised from hot water, yield 12 parts, M. 187°. Found: acid equivalent 92.4; C, 43.25%; H, 5.55%; N, 5.00%. $C_{10}H_{15}O_8N$ requires acid equivalent 92.4; C, 43.32%; H, 5.45%; N, 5.05%.

25 parts of tri-β-carboxyethyl nitromethane, 200 parts water and 7 parts of Raney nickel were shaken at 110° for 1½ hours in a stainless steel autoclave under a hydrogen pressure of 2500 lbs. The reaction mixture was filtered, evaporated under reduced pressure almost to dryness and acetone added, when a small amount of nickel complex, of probable formula

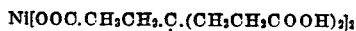

separated and was filtered off. The mother liquors on standing at −60° deposited 6 parts of almost colourless, crystalline lactam, 5.5-di-(β-carboxyethyl)-pyrrolidone-2, M. 160–1°, which after recrystallising from water, washing with acetone and drying in vacuo had M. 162°, acid equivalent 115.3; C, 52.20%; H, 6.49%; N, 6.17%. $C_{10}H_{15}O_5N$ requires acid equivalent 114.6; C, 52.40%; H, 6.60%; N, 6.11%.

The mother liquors separated from the lactam were evaporated to dryness under reduced pressure leaving 9 parts of amino acid, CCC-(tri-β-carboxyethyl)-methylamine, M. (partial) 80–83°, acid equivalent, 121.7; $C_{10}H_{17}O_6N$ requires acid equivalent 123.6. Recrystallisation from water yielded a purer product M. (partial) 82–4°, acid equivalent 123.7; N, 5.62%; $C_{10}H_{17}O_6N$ requires N, 5.67%. The absence of a sharp melting point is attributed to transformation to the lactam. Crystallisation of the amino acid from boiling ethanol or butanol yielded the lactam while on boiling the latter with water for 15 minutes partial transformation to the amino acid occurred.

6 parts of CCC-tri-β-carboxyethyl-methylamine and 4.2 parts diformyl-hexa-methylene diamine were heated in hydrogen for 2 hours at 255°, ¼ hour at 278° and 1 hour at 278°/0.5 mm. A clear, slightly brownish polymer was obtained from which fibres could readily be drawn. It melted at about 140° and was soluble in formic acid, ethanol and m-cresol, the intrinsic viscosity in 1% solution in the last solvent being 0.50. Similarly on heating the amino tricarboxylic acid with 1 mole of hexamethylene diamine at 278° for ½ hour, and at 278°/0.5 mm. for ½ hour there was obtained a polymer intrinsic viscosity, 1% in m-cresol, 0.32.

*Example VI*

The triethyl ester of tri(β-carboxy-ethyl) nitromethane was prepared as follows: 8 parts of the acid prepared as in Example V above were refluxed with 65 parts of 3% absolute ethanolic hydrogen chloride for 16 hours, most of the alcohol distilled off and the residue diluted with aqueous sodium carbonate and sufficient ether to ensure good separation into two layers. The ethereal layer was washed again with carbonate solution, then with water, dried over sodium sulphate and the ether removed. The residual material was distilled at 0.002 mm. Hg at a base temperature 170° C., yield 8.3 parts tri-(β-carbethoxy-ethyl)-nitromethane as a colourless, rather viscous oil $n_D^{21} 1.4620$. Found: C, 53.13; H, 7.33%. $C_{16}H_{27}O_8N$ requires C, 53.16; H, 7.53%.

20 parts tri-(β-carbethoxyethyl)-nitromethane, 80 parts of alcohol and 5 parts of Raney nickel were shaken in a stainless steel autoclave at 170–190° for 5 hours under a hydrogen pressure of 2500 lbs. After filtering and removing the alcohol by distillation 15.0 parts of pale yellow, viscous liquid were obtained, which solidified on cooling strongly. Recrystallisation from dry ether yielded 11.8 parts of 5.5-di-(β-carbethoxyethyl)-2-pyrrolidone m. 44.5°. Found: N, 4.9%. $C_{14}H_{23}O_5N$ requires N, 4.9%. This lactam ester can be distilled under 0.01 mm. Hg, base temperature 180–195°.

11.4 parts 5.5-di-(β-carbethoxyethyl)-2-pyrrolidone and 6.9 parts decamethylene diamine in 30 parts of ethanol were heated in hydrogen, at first at a moderate temperature permitting slow removal of alcohol and later for 2 hours at 195° and 1 hour at 255°/1 mm. The polymer remained as a hard brown glass, soluble in ethanol, formic acid and m-cresol, intrinsic viscosity (1% in m-cresol) 0.73. It formed rather elastic fibres with ability to be cold drawn and had melting point of about 170° C.

Example VII 10 parts of 5.5-di-(β-carboxyethyl)-2-pyrrolidone prepared as in Example V above and 7.5 parts of diformyl-hexamethylene diamine were heated in hydrogen for 4 hours at 255° and 3 hours at 255°/1.0 mm. The polymer, a hard brown, clear glass, melted 160-5° C. Long fibres could readily be drawn from the melt. The intrinsic viscosity (1% in m-cresol) was 0.66.

The invention includes the production of mixed polymers by using appropriate mixtures of different reagents of the same or of different types. This as illustrated in Examples III and IV above, mixtures of different $\alpha$-$\alpha'$ diamino dicarboxylic acids may be co-polymerised. Again in condensing two molecules of aspartic acid with one molecule of a diamine, two or more different diamines may be used, the quantities used together making up the molecular proportion required. Similarly an aminotricarboxylic acid of the type of tri(β-carboxyethyl)-methylamine may be condensed with an equimolecular proportion of a mixture of two or more different diamines. Generally the effect of such co-polymerisation is to lower the melting point and increase the solubility as compared with the simple polymers.

As will be seen from the above examples both of the Type I and of the Type II polymers the polymerisation is carried out simply by subjecting the raw materials to the ordinary amide-forming conditions, for example by heating generally to temperatures of the order of 150–300° C. The condensation is continued until the polymer has the desired molecular weight. One of the principal purposes of the present invention is to produce polymers which are fibre-forming. This simply means that the condensation is continued until a test shows that the polymer can form fibres. For example, when carrying out the condensation in the melt, a rod may be dipped into the molten polymer and drawn away to ascertain its fibre-forming properties. Generally the condensation may be carried out with or without a diluent. In the former case preferably while melting the monomeric substance or the low polymers obtained after the condensation has been carried some way. Where a diluent is used, it is preferably a solvent for the resulting polymer, for example a phenolic solvent such as phenol itself, the cresols and xylenols. Conveniently the solvent or diluent is so chosen that it boils at the desired polymerisation temperature, so that the condensation, at least in its initial stages, may be carried out at atmospheric pressure while boiling. In the case where a volatile body such as water or ethyl alcohol is split off during the condensation, it is desirable, as the condensation proceeds, to apply vacuum or alternatively a current of inert gas, so as to promote the condensation. It is sometimes desirable to employ a condensation catalyst with a view to carrying out the reaction at a lower temperature than would otherwise be possible. This seems to be especially advantageous where a secondary amino group is to be reacted with a carboxylic group. A very small proportion of phosphoric acid, for example of the order of .01 to .1% of the reagents, is usually sufficient for this purpose. To avoid discolouration, it is in all cases desirable to exclude air, so that the condensation may, for example, be carried out in the presence of oxygen-free nitrogen, hydrogen or other inert gas.

The carboxylic acid may be used in the free state or in the form of an ester or halide or amide or (if water is present) as nitrile. Similarly, instead of using the free amino groups, acidylamino groups containing acidyl groups which are readily replaced, for example the formyl radicle, may be used.

As previously stated, in the case of a single starting material or series of starting materials, it is relatively easy to determine whether or not it is a suitable material for the purpose of the present invention. The general considerations are, however, somewhat complex. In the case of polymers of Type 1 which carry a pair or two pairs of amide-forming groups in which the individuals of the pair are adjacent to each other and this pair of amide-forming groups is to react with a corresponding pair of complementary amide-forming groups in another molecule, as already stated, the position of the individuals of each pair with respect to each other must be such that a 5- or 6-membered ring may result. It is customary in this art to refer to radicle lengths of molecules or pairs of molecules. The radicle of oxalic acid, for instance, is —CO.CO—, that of carbonic acid is —CO—, and that of ethylene diamine is —NH.CH$_2$.CH$_2$.NH—. The radicle length of oxalic acid is thus 2, that of carbonic acid is 1, while the radicle length of ethylene diamine is 4. Using this terminology, the radicle length of the amino group with respect to the carboxylic group in an $\alpha$-amino-carboxylic acid is 3. When, therefore, an $\alpha$-amino-carboxylic acid is condensed with itself or another $\alpha$-amino-carboxylic acid to form a 2.5-diketo-piperazine ring, the sum of the two radicle lengths is 6. In other words, the sum of the radicle lengths of the two pairs of complementary reactive radicles is the sum of the number of atoms in the ring to be formed. Hence, in the reagents of the present invention, which contemplates the production of carboxylic amide-containing rings having 5 or 6 atoms in the ring, the sum of the radicle lengths of the pairs of amide-forming radicles designed to form those rings is 5 or 6. This gives the clue to the method of determining whether or not the raw material is suitable for the purpose of the present invention. Similarly in the case of Type 2, two amide-forming radicles in the starting material must be separated from each other by three or four atoms, that is to say the radicle length of the amino group with respect to the carboxylic acid group is 5 or 6. The remaining two amide-forming groups in the same molecule must be so separated from each other that they cannot form another 5- or 6-membered ring.

Another way of looking at the matter is to consider the formation of the linear polymer and of the carboxylic amide-containing ring as two separate operations. This will be illustrated by reference to the formation of polymers already referred to above (a) From an $\alpha\alpha'$-diamino-dicarboxylic acid of each type, and
(b) From two molecules of aspartic acid with one molecule of a diamine, and
(c) From one mole of the amino-tricarboxylic acid obtained from nitromethane and acrylonitrile together with one mole of diamine.

In each case it may be considered that one of the reactions involved consists in forming the linear polymer. In the case of the first type of αα'-diamino-dicarboxylic acid, the linear polymer (before ring formation) has the arrangement

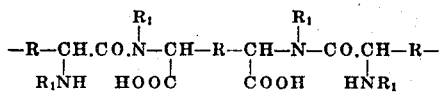

In the case of the second type of reagent, e. g. the polymethylene bis-imino-acetic acid type, the molecules after condensation to form the linear polymer but before ring formation, are of the type

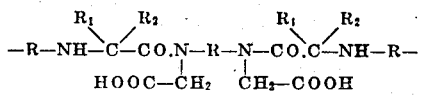

Again, in condensing two moles of aspartic acid, the condensation to produce the linear polymer (without ring formation) may be considered to take place according to the equation

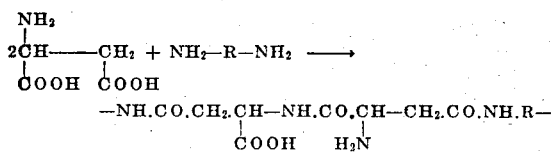

Finally, one part of the condensation of CCC-tricarboxyethyl methylamine with one mole of diamine may be considered to take place according to the equation

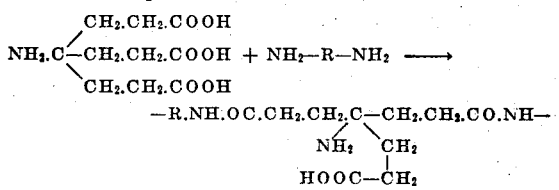

It will be noted that each one of these linear polymers contains an amino group and a carboxylic acid group in a position separated from each other by three or four atoms, so that they are able to form the 5- or 6-membered carboxylic amide-containing ring which forms an important part of the polymers of the present invention. This view of the matter serves to elucidate the principles on which the raw materials are selected for the purpose of the present invention, but it is not intended to suggest that the condensation actually takes place with the formation of a linear polymer first, followed by ring-closure. The principles to be followed in the selection of the positions of the amide-forming groups for the formation of the linear polymer (i. e. apart from the ring formation) are already well known. Thus, in the case of using an amino group and a carboxylic acid group in the same molecule, it is known that these groups should not be separated from each other by three or four atoms if a linear polymer is to result. Similarly, in the case of using two amino groups in one molecule and two carboxylic acid groups in another to form the linear polymer, it is recognised that the combined radicle lengths of the diamine and the dicarboxylic acid should not be less than 7, and further the dicarboxylic acid should not have a radicle length of 4, because of the tendency to form rings of the succinimide type. The same considerations apply to the positioning of the amide-forming groups in the raw materials of the present invention insofar as these amide-forming groups are to form the linear polymer. Thus, the present invention utilises the known principles of forming linear polymers from amino-carboxylic acids or diamines and dicarboxylic acids, and superimposes upon these principles additional principles designed to give rise to the ring formation at the same time as the formation of the linear polymer. There is one further point, however, with regard to the known limitations upon forming linear polymers from amino-carboxylic acids or their diamines and dicarboxylic acids. In the present invention, steric influences sometimes remove restrictions already present in the known art. Thus, in the known art, in order to form a linear polymer from an amino-carboxylic acid, it is not possible to use an amino-carboxylic acid in which the amino and carboxy groups are separated by three or four carbon atoms. This restriction is not always present in the raw materials of the present invention. αα'-diamino-glutaric acid has already been referred to as a raw material which contains one amino group and one carboxylic acid group which are capable of forming a carboxylic amide-containing ring and containing an additional amino and carboxy group which are capable for forming the linear polymer. These additional amino and carboxy groups are still separated from each other by three carbon atoms, but, owing to steric hindrance, they are not capable of forming a ring and are therefore available for forming the linear polymer. This case is quite different from the case of ββ'-diamino-adipic acid, in which each amino group is separated from a carboxylic acid group by three carbon atoms, and can therefore form a butyrolactam ring, and steric influences do not prevent the formation of two rings. The dilactam of ββ'-diamino-adipic acid is a known compound.

Where, as in the condensation of two molecules of aspartic acid with one molecule of diamine or in the condensation of one molecule of diamine with one molecule of the aminotricarboxylic acid from nitromethane and acrylonitrile, two different kinds of reagents are used in the production of the polymer, the ultimate molecular weight of the polymer may be determined by the exact proportion in which the reagents are used. A small departure from the proportions mentioned serves to limit the average molecular weight which may be achieved. Thus the diamine may be used in a slight excess over one molecule or in a quantity slightly less than one molecule (the other reagent being then in slight excess). By this means it is possible to predetermine the maximum average molecular weight which may be produced. By using this device the polymer is at the end of the polymerisation stable as regards its viscosity and is not liable to undergo further polymerisation on heating. Generally the molecular excess or deficiency to be used is of the order of 1-5% above or below the stoichiometric proportion in order to obtain polymers which are fibre-forming. The smaller the difference between the actual proportion used and the stoichiometric proportion, the higher will be the average molecular weight of the polymer and the higher its viscosity.

The above polymers may likewise be viscosity stabilised by inclusion in the reaction mixture of a small proportion of a substance containing a single amide-forming group. Such substances are preferably relatively non-volatile, for example long chain aliphatic monoamines or monocarboxylic acids, e. g. dodecylamine, octadecylamine, lauric acid or stearic acid, though monoamines or monocarboxylic acids of lower molecular weight may be used. The molecular proportions in which such substances should be used are of the same order as the molecular excess of diamine mentioned above.

In the case of the $aa'$-diaminodicarboxylic acids which are condensed with themselves a similarly small proportion of an $a$-amino acid, such as glycine or $a$-alanine, may be used as viscosity stabiliser.

The invention includes not only the production of the linear polymers, but also the production therefrom of filaments, films and other articles. In forming filaments, the choice of the method of spinning depends in part on the properties of the polymers. Where solutions in organic solvents can readily be produced, dry spinning methods may be employed with solutions in volatile solvents, and wet spinning methods with solutions in volatile or even comparatively non-volatile solvents. The polymers can be spun by melt spinning methods, i. e. by extruding a melt of the polymer through suitable orifices. In general, the temperature of the polymer to be extruded should be some 10–30° above the melting point of the polymer. This melting temperature may be modified to some extent by mixing the polymer with suitable proportions of plasticisers, for example sulphonamide plasticisers, phenolic plasticisers, urea and thiourea plasticisers and the like. Such plasticisers may either be left in the products or may be partially or completely extracted therefrom.

The filaments so formed may be drawn out at comparatively low temperatures, or even at atmospheric temperature, to very fine filaments having high tenacity and good elasticity. The resulting filaments may then be used for any of the purposes to which artificial silks have in the past been applied.

While the invention is especially directed to the manufacture and application of fibre-forming polymers, it is not limited thereto and embraces the production of similar polymers suitable, for example, for use as softening agents, coatings, film-forming substances, and the like. Moreover, for these applications the polymers of the present invention may be mixed with other fibre-forming, film-forming or lacquer substances or other ingredients, for example cellulose acetate, aceto-butyrate, butyrate and aceto-stearate, ethyl cellulose, oxyethyl cellulose, oxyethyl cellulose acetate, benzyl cellulose and other cellulose derivatives, plasticisers or softening agents, dyestuffs, pigments and the like. The expression "liquid phase" is used in the claim to connote that the reagents are molten or in solution in a liquid solvent.

Having described our invention, what we desire to secure by Letters Patent is:

Process for the production of linear polyamides, which comprises heating in m-cresol $a.a'$ di-primary-amino-sebacic acid ethyl ester, said amino and ester groups being the sole reactive groups present in the reaction mixture.

SIDNEY JAMES ALLEN.
JAMES GORDON NAPIER DREWITT.

REFERENCES CITED

The following references are of record in the file of this patent:

UNITED STATES PATENTS

| Number | Name | Date |
|---|---|---|
| 2,341,611 | Hagedorn et al. | Feb. 15, 1944 |
| 2,343,808 | Schlack | Mar. 7, 1944 |
| 2,389,662 | Fisher et al. | Nov. 27, 1945 |